United States Patent
Auer, Jr. et al.

[15] 3,653,043
[45] Mar. 28, 1972

[54] DIGITAL RADAR INTERFACE

[72] Inventors: John H. Auer, Jr., Fairport; Jerry P. Huffman, Rochester, both of N.Y.

[73] Assignee: General Signal Corporation, Rochester, N.Y.

[22] Filed: Feb. 6, 1970

[21] Appl. No.: 9,257

[52] U.S. Cl. ............................343/8, 343/5 DP, 246/18 ZA
[51] Int. Cl. ..........................................G01s 9/44, B61l 3/00
[58] Field of Search ....................343/5 DP, 8; 246/18 ZA

[56] References Cited

UNITED STATES PATENTS 3,365,716   1/1968   Jorgensen ..................................343/8

*Primary Examiner*—T. H. Tubbesing
*Attorney*—Harold S. Wynn

[57] ABSTRACT

Registry apparatus for generating digital output signals to a computer representing parameters necessary for computing the speed of a vehicle has been provided. The registry apparatus responds to radar apparatus which provides doppler shift frequency signals representative of the velocity of the moving vehicle. The improvement in the present invention includes an accumulator means responsive to the doppler pulses for producing a count signal representative of the number of pulses at prescribed counts. Timing cycle means coupled to the computer produces a pulsed output and generates a scan signal to the computer over a selected interval of the cycle while synchronizing means responds to the accumulator means and the timing cycle means producing a register pulse at the prescribed counts. Output means coupled to the computer stores the total accumulator count signal and the timing cycle pulses for each registered pulse since the previous scan signal and provides an output to the computer for processing the differences between the previous count signal and the present count signal and the time over which that difference occurred during the selected interval of the computer scan.

7 Claims, 1 Drawing Figure

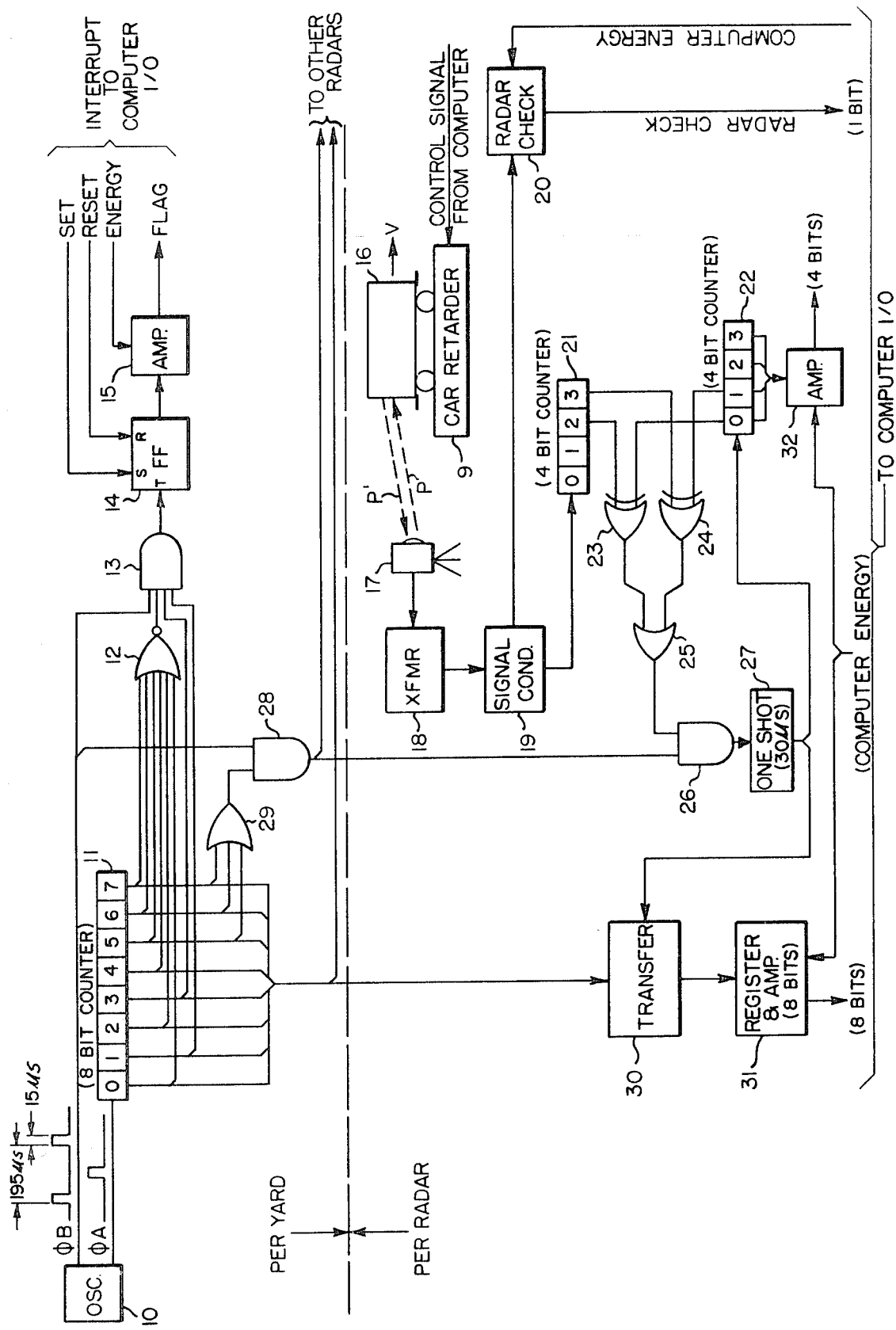

DIGITAL RADAR INTERFACE

BACKGROUND OF THE INVENTION

This invention relates to speed detection apparatus and in particular to a registry device for providing digital output signals to a computer representing parameters necessary for computing the speed of a vehicle.

In the automatic classification of railroad vehicles in a yard operation, it is necessary to be able to determine the speed of the rolling stock. Cars are moved to the entrance of the yard which is a hump or a ramp which leads down to the various class tracks. Cars are released at the top of the hump and where automatic switching apparatus is employed a route is set up for the car's final destination. The distance a car must travel to reach its particular intended point and the various rolling characteristics and weights of the cars involved make it necessary to in some cases retard the speed of the car as it moves towards the desired location. In automated classification yard, car retarders are set up along the route and control systems governed by a central computer actuate the retarders to specific rates of retardation to slow the cars down to a release speed which should yield an optimum coupling characteristic. It is necessary therefore to be able to accurately determine the speed of the vehicles moving through the retarder.

Radar apparatus has been used to determine the velocity of the vehicle by transmitting a signal towards the vehicle and receiving reflected pulses of energy from the vehicle as it moves away from the radar device. Since the vehicle is moving, the received energy is out of phase with the transmitted radar signal and a doppler beat frequency is detected by the radar receiver. This doppler frequency is used to yield an indication of the velocity of the moving vehicle. When a computer is used to provide control signals to the various car retarders, the information provided by the doppler frequency must be converted into language which can be readily interpreted by the computer. Some analog computers convert the frequency to a DC analog voltage which can be used as a direct input to the computer. However, analog signals have inherent drift and calibration problems which must be corrected in order to provide a reliable system. If a digital computer is incorporated as the central control apparatus, then the analog signal must be converted into digital form, however, this analog to digital conversion equipment is costly and has rather inconvenient maintenance problems.

It has been suggested, therefore, to covert the radar doppler frequency directly into digital form for analysis by the computer.

It is therefore an object of the present invention to provide a system which obviates the shortcomings and problems of the prior art.

It is another object of the present invention to covert a radar signal directly into digital form for analysis by a central computer.

It is yet another object of the present invention to provide a simplified interface to a digital computer.

SUMMARY OF THE INVENTION

There has been provided a registry apparatus for generating digital output signals to a computer representing parameters necessary for computing the speed of a moving vehicle. The registry apparatus provides the output signals in response to radar equipment projecting pulsed energy at the vehicle and respondingly generating doppler frequency signals reflected therefrom. The improvement in the present invention includes an accumulator means responsive to the doppler pulses for producing a count signal representative of the number of doppler pulses at prescribed counts. Timing cycle means coupled to the computer produces a pulsed output and generates a scan signal to the computer over said selected interval of the cycle. Synchronizing means responsive to the accumulator means and the timing cycle means produces a register pulse at the prescribed counts and an output means coupled to the computer stores the total accumulator counter signal and the timing cycle pulses for each registered pulse since the previous scanning signal for input to the computer during the selected interval of the scan.

For a better understanding of the present invention together with other and further objects thereof, reference is had to the following description taken in connection with the accompanying drawing while its scope will be pointed out in the appended claims.

The drawing shows the preferred embodiment of the present invention together with the radar input and the interface to the computer.

DESCRIPTION OF THE PREFERRED EMBODIMENT

The present invention seeks to provide an input to a digital computer representative of the velocity of a moving vehicle. The input to the computer must be in such a form that it can be readily interpreted and operated upon for controlling various apparatus dependent upon such velocity information. The present embodiment contemplates the use of a digital computer as the central processing unit and the computer requires bits of binary information representative of the speed of the vehicle.

One way to convert the frequency of a steady signal to a digital signal is to count the cycles during a specified gating interval. This may not necessarily be satisfactorily for radar application since it cannot simultaneously meet stringent requirements of requirements of response speed and resolution. To count enough cycles to obtain a satisfactory speed resolution would take far too long for the proper operation of a railroad classification yard. In order to measure frequency with adequate resolution and speed, it is necessary to include information about the period of the signal. Hence, the scheme disclosed herein periodically inputs to the computer a 12 binary word which contains a 4 count number and an 8-bit time number. The time represented by the 8-bit time number is the time of occurrence of the last count included in the 4-bit count number. Each time a new 12 bit word is put into the computer, frequency is computed by dividing the number of counts which occurred since the preceding input, by the time which elapsed since the preceding input. The count difference is obtained by subtracting the old count from the new.

The hardware necessary for performing the required functions is represented in the drawing in block form. The basic clock of the systems is a pulse oscillator 10 which has two outputs, phase A and phase B. The outputs provide pulses at the same periodic rate but separated by a phase difference of 180°. Phase A pulses are inputed to an 8-bit counter 11 having outputs to NOR-gate 12. NOR-gate 12 delivers an output to AND-gate 13 only when all of its inputs are ZEROS. Two additional inputs 1 and 3 of counter 11 and phase B pulses are also provided to AND-gate 13. The 8-bit counter 11 represents 256 counts per cycle. So only once for each cycle will outputs 1 and 3 of counter 11 be ONES for activating AND-gate 13, while of course the other outputs 0, 2, 4, 5, 6 and 7 are ZEROS. When AND-gate 13 is activated, flip-flop 14 is toggled to its other state producing an output to amplifier 15 generating a flag to the computer input. This flag interrupts the computer which in turn interrogates the radar apparatus of the present invention. When the interrogation is complete, the computer provides a signal to the flip-flop 14 for setting and resetting the flip-flop depending upon its conductance state for the next interrupt signal.

This portion of the apparatus of the present invention shown above the dotted line indicated by the notation per yard means that only one oscillator 10, 8-bit counter 11 and interface for interrupt to the computer is necessary for a complete yard. The apparatus below the dotted line which is noted by the per radar notation means that the apparatus represented below the dotted line must be used for each sensing unit. When the computer is interrogated, it may read a large number of the outputs of the radar units in a very short time and by using a master clock as previously described, the system throughout the yard may be in synchronism and generally requires less duplication of effort and apparatus.

The radar signal shown as an input to transformer 18 is the frequency indicative of the speed of the vehicle which is to be measured. This radar signal is developed by transmitting pulses from radar unit 17. These pulses P are directed towards the railroad vehicle 16 and a portion of these signals are reflected back as P'. Since the railroad vehicle is moving, the reflected signals P' are out of phase with the transmitted signals P and a doppler shift frequency is generated in the radar unit 17 which is transmitted as the radar signal to the transformer 18. The transformer is coupled to signal conditioner 19 which converts the alternating current signal into a square wave for transmission of the 4-bit counter 21. Radar check 20 which is coupled to the signal conditioner 19 checks the strength of the signal and only signals having a strength above some minimum level are interpreted as valid radar signals. Hence, if the 1-bit radar check signal is not present at the interface, then the computer refuses to recognizes valid the other signals from the register 31 and amplifier 32 outputs. In addition, the computer may provide an alarm or other indication if the radar unit 17 fails so that maintenance crews may be sent out to repair or replace the unit.

According to the concepts of the present invention, it is necessary for the last 2 bits of 4-bit counter 21 to agree with the first 2 bits of the second 4-bit counter 22. The signal conditioner drives the 4-bit counter 21 and on every fourth pulse, as represented by output 2 of the 4-bit counter, a change of state occurs relative to output O of the second 4-bit counter 22. Inputs to EXCLUSIVE OR-gate 23 sense that there is a difference between the output 2 of counter 21 and the output 0 of counter 22. A signal is therefore generated to OR gate 25 and thence to AND-gate 26. The use of the EXCLUSIVE OR-gates 23 and 24 is such that only when the inputs are different will a signal be transmitted from the EXCLUSIVE OR. The AND-gate 26 generates a signal to one-shot multivibrator 27 which provides a signal to the second 4-bit counter 22. This signal drives the counter 22 into a state which is the same as the 4-bit counter 21. EXCLUSIVE OR-gate 23 then ceases to transmit a signal to the one-shot 27 because both inputs 2 of counter 21 and 0 of counter 22 are the same. At the same time, the one-shot 27 sets the input to 4-bit counter 22, the same signal is transmitted to transfer apparatus 30. The transfer 30 has no storage capability as such but is essentially a set of AND gates each having two inputs, one from an associated output of counter 11 and a second from one-shot 27. Each time the signal is received from one-shot 27, the gates in transfer 30 are activated with the count as is present in counter 11 for registry in register 31. These signals are registered to a total count since the previous signal from one-shot 27. When a pulse from the one-shot 27 activates transfer 30, the total count stored in the 8-bit counter 11 is transmitted to register 31 and stored until retrieved by the computer.

It is essential that the total counts from the oscillator 10 and counter 11 are in synchronism with the radar apparatus. The AND-gate 26 is used to accomplish this result. OR-gate 29 is driven by outputs 5, 6 and 7 of counter 11. A one set at any of these outputs will provide for activation of the OR-gate 29 and pulses from phase B of the oscillator 10 activate the second input to AND-gate 28. Once activated, AND-gate 28 provides an input to AND-gate 26. According to the concept of the present invention, it is contemplated that for all but approximately 6 msec. of the total cycle time, AND-gate 28 is providing an output to AND-gate 26. The first 6 msec. of the cycle time is reserved for the scanning by the computer. During the scan time, it is not desirable to permit registration of counts by one-shot 27, 4-bit counter 22 and transfer 30. The AND-gate 26 therefore is inhibited for the 6 msec. period from permitting transmission of any signals form the OR-gate 25 and EXCLUSIVE OR-gates 23 and 24. The cycle time of the system is chosen such that no more than 8 to 10 doppler counts are anticipated in the 6-millisecond scan period. Under these conditions, the 4-bit counter will never repeat and possibly synchronize itself with the second 4-bit counter 22 during that short 6-millisecond interval. While it is possible for this to occur with high vehicle speeds, in railroad yard operations the bit capacity of counters 21 and 22 are chosen in accordance with anticipated maximum speed so that this should not occur. If the speeds were higher as in some other application, then the bit capacity of the counters 21 and 22 would have to be increased. The counts registered in the 4-bit counter 22 are transmitted to amplifier 32. The amplifier 32 raises the signal level to an adequate level for use by the computer. The 4-bit counter actually is a divider of the original total number of counts from the radar signal. However, programming of the computer can take this fact into account and calculate the proper speed from the information available without undue sacrifice of accuracy.

If counts occur from the radar signal during the 6-millisecond inhibit time, they are stored in the 4-bit counter 21. When the inhibit is terminated, pulses from phase B of the oscillator 10 are transmitted through AND-gate 28 to AND-gate 26 and continue to pulse the one-shot multivibrator 27 until EXCLUSIVE OR-gates 23 and 24 sense that the last two bits of 4-bit counter 21 and the first two bits of 4-bit counter 22 are in exact correspondence. If this were not done, then it would be possible to have an ambigious signal because some of the radar pulses would not be accounted for.

The phase A and phase B outputs of the oscillator 10 are chose as such because it is desirable to have the 8-bit counter 11 clocking at a certain frequency in synchronism with the radar apparatus. However, it is not desirable to permit a transfer or have the 4-bit counter 22 register a pulse at the same time as the counter 11 is shifting states. This might cause an ambigious signal to occur. Even though the counter 11 and the operation of the one-shot 27 are out of phase, they are still in synchronism with time, because the frequency of phase A and phase B signals are identical.

Briefly stated the functions of the various components of the present invention cooperate as follows. Radar apparatus 17 generates a radar signal having a frequency indicative of the velocity of the moving vehicle 16. The signals are transformed, conditioned and checked by appropriate apparatus 18, 19 and 20 respectively and also transmitted to a 4-bit counter 21. This counter is used in conjunction with the other devices of the present invention in order to reduce the amount of time necessary for measuring the frequency of the radar signal. In order to determine the frequency precisely, it is necessary to measure not only the number of cycles which occur but also the period over which these cycles are present. The 4-bit counter 21 counts the number of pulses which occur and when an out of correspondence condition is detected through EXCLUSIVE OR-circuits 23 and 24, a signal is generated through OR-circuit 25 an AND-circuit 26 to one-shot multivibrator 27 which is coupled to a second 4-bit counter 22. This 4-bit counter 22 is normally in correspondence state with the counter 21. Signals from the one-shot multivibrator 27 provided through the logic circuitry 23, 24, 25 and 26 drive the counter 22 into a state which has the first two bits of counter 22 the same as the last two bits of counter 21. At the same time, a transfer apparatus 30 receives a time signal from 8-bit counter 11 which is driven by a pulse oscillator 10. This pulse oscillator 10 is also synchronized with the logic circuitry coupling the counters 21 and 22 and more precisely with the AND-gate 26 driving multivibrator 27. When one-shot multivibrator 27 produces an output pulse, driving counter 22 into correspondence with counter 21, the same energy drives transfer 30, transferring the count of counter 11 into a register 31. Again, if radar pulses are transmitted to counter 21 and the previous cycle of events occurs again, a second signal indicative of time will be transferred from counter 11 to register 31. At the time the out of correspondence state between the counter 21 and counter 22 is updated by the energy supplied by the phase N pulses through multivibrator 27, the output of 4-bit counter 22 is constantly detected by amplifier 32 which is interfaced with the computer as well as register and amplifier 31. Register and amplifier 31 is a storage device as, for example, a counter capable of parallel input to each stage from transfer 30 gates and included in register and amplifier 31 is an amplifier similar in nature to amplifier 32 for raising the signal level of the signals to that which is useful to the computer. The counter 11 has a predetermined number of counts in a cycle. In this particular case, the 8-bit counter 11 registers 256 counts per cycle for a certain interval of the count cycle. Interface apparatus including NOR-gate 12, AND-gate 13, flip-flop 14 and amplifier 15 provides signals which interrupt the computer and require an interrogation by the computer of the radar apparatus interface including register 31 and amplifier 32. The remainder of the cycle time of the counter 11 is devoted to taking time measurements and count measurements of the radar signals. Each time the radar apparatus is interrogated, previous information having already been read into the computer is compared with the information being detected at the present time. A comparison is made first of the number of counts since the previous interrogation and then the elapsed time since the previous interrogation. The difference in the counts divided by the difference in the time yields a value indicative of the velocity of the moving vehicle. The register and amplifier 31 reads out an 8-bit binary number representative of the elapsed time while the amplifier 32 reads out a 4-bit number representative of the number of counts since the previous interrogation. This total 12-bit word is read into the computer upon the interrogation required by the interrupt of the interface apparatus previously described. The computer now having these two sets of binary words may readily calculate the velocity and provide control signals to the car retarder 9 for reducing its speed to an optimum value for the desired coupling characteristic.

The use of the 4-bit counter 21 also serves the purpose to store radar signals during the interrogation phase or scan phase of the computer interrupt. The number of bits in the counter 21 namely 4 is sufficient to store the anticipated number of radar signal pulses which could possibly occur during the scan time of the computer. These signals are stored in the counter 21 for the scan time by means of an inhibit provided by AND-gate 28 to AND-gate 26. This inhibit is caused by a deenergization of one of the inputs to AND-gate 26 from AND-gate 28 which in turn is driven by the phase B of the oscillator 10 and an OR-gate 29 connected to outputs of 8-bit counter 11. The OR-gate 29 having inputs from the 5, 6, 7 outputs of the counter 11 provides an output to AND-gate 28 for all but approximately a 6-millisecond period of the total counter time cycle. As soon as the inhibit is released from AND-gate 25, phase B pulses from oscillator 10 are transmitted through AND-gate 28 to AND-gate 26 and if an out of correspondence condition exists between counter 21 and 22, this condition is detected by EXCLUSIVE OR-gates 23 and 24 and transmitted through OR-gate 25 to the other input of AND-gate 26. Until such time as the out of correspondence condition ceases to exist, phase B pulses drive one-shot multivibrator 27 which in turn activates counter 22 for catching up with the condition represented on counter 21.

These various counting circuits and logic components have been incorporated into the present device in order to simplify the interface between a radar detection unit and a digital computer and also to provide a reliable system for manipulating a frequency signal into a proper digital word signal representative of velocity.

While there has been described what at present is considered to be the preferred embodiment of the present invention, it will be obvious to those skilled in the art that various changes and modifications may be made therein without departing from the invention, and it is therefore aimed in the appended claims to cover all such changes and modifications that fall within the true spirit and scope of the invention.

What is claimed is:

1. Registry apparatus for providing digital output signals to a computer representing parameters necessary for computing the speed of a vehicle, said registry apparatus generating said output signals in response to radar equipment projecting pulsed energy at said vehicle and respondingly generating doppler frequency signals reflected therefrom wherein the improvement comprises:
   a. accumulator means responsive to the doppler pulses for producing a count signal representative of the number of doppler pulses at prescribed counts;
   b. timing cycle means coupled to the computer producing a pulsed output and generating a scan signal to the computer over a selected interval of said cycle;
   c. synchronizing means responsive to the accumulator means and the timing cycle means for producing a register pulse at the prescribed counts; and
   d. output means coupled to the computer for storing the total accumulator count signal and the timing cycle pulses for each register pulse since the previous scan signal, for parallel digital input to the computer during the selected interval of the scan.

2. The registry apparatus of claim 1 including means coupled to the synchronizing means for inhibiting the register pulse during the scan of the computer.

3. The registry apparatus of claim 2 wherein said accumulator means includes: a first counter responsive to said radar apparatus for producing counts of the doppler pulses at prescribed counts; and a second counter responsive to the condition of the first counter and producing the count signal in digital form.

4. The registry apparatus of claim 3 wherein the first counter includes: storage bits for maintaining accurate count of the doppler pulses during the scan interval of the timing cycle means.

5. The registry apparatus of claim 3 wherein said timing cycle means comprises a pulse oscillator having first and second phase displaced outputs, and
   a third counter having a predetermined cycle of counts coupled between the first output of the oscillator and the computer for producing the scan signal during the particular interval of the third counter cycle, the second output of the pulse oscillator being coupled between the synchronizing means and the third counter for driving said synchronizing means in accordance with said third counter.

6. The registry apparatus of claim 5 wherein said synchronizing means comprises:
   two EXCLUSIVE OR-gates, the first gate having inputs from a third and first bit of the first and second counters respectively and the second gate having inputs from the fourth and second bits of said counters;
   means coupling the output of said gates with the first output of the timing cycle means to the first bit of the second counter for correcting said second counter to correspond with said first counter.

7. The registry apparatus of claim 5 wherein said output means comprises:
   transfer means coupled to the third counter for inhibiting until cleared the counts produced therefrom; said transfer means cleared by said register pulse;
   digital readout means responsive to the clearing of the transfer means for reading out the counts to the computer since the last transfer; and
   means responsive to the second counter for reading out the number of doppler pulses each time said second counter is synchronized with said first counter on a register pulse.

* * * * *